United States Patent
Kimura

[15] 3,645,182
[45] Feb. 29, 1972

[54] FILM WINDUP DEVICE FOR CAMERAS

[72] Inventor: Shuji Kimura, Tokyo, Japan

[73] Assignee: Nippon Kogaku K.K., Tokyo, Japan

[22] Filed: Oct. 14, 1969

[21] Appl. No.: 866,189

[30] Foreign Application Priority Data

Oct. 18, 1968 Japan..................................43/75624

[52] U.S. Cl..........................................95/31 AC, 242/71.4
[51] Int. Cl....................................G03b 19/02, G03b 1/06
[58] Field of Search....................242/71.4, 71.5, 71.3, 71.6; 95/31

[56] References Cited

UNITED STATES PATENTS

| 2,398,133 | 9/1946 | Cronholm | 242/71.5 |
| 3,021,773 | 2/1962 | Hintze et al. | 242/71.4 |
| 3,491,957 | 1/1970 | Sawado et al. | 242/71.5 |

Primary Examiner—George F. Mautz
Assistant Examiner—Milton Gerstein
Attorney—Ward, McElhannon, Brooks & Fitzpatrick

[57] ABSTRACT

With a film windup device of this invention, rotary motion of sprocket or sprocket shaft is transmitted to spool by way of clutch mechanism; shutter windup system is separated from sprocket and spool by using the rewind mechanism to allow the shutter to be wound alone; shutter is separated in the case of rewinding by rewind mechanism; only the sprocket can be rotated backward by the action of the aforementioned clutch without transmitting the backward rotation to the spool.

5 Claims, 7 Drawing Figures

PATENTED FEB 29 1972 3,645,182

FILM WINDUP DEVICE FOR CAMERAS

This invention relates to a film-winding device for cameras.

There are three types of conventional film-winding devices.

According to the first conventional type, rotation of windup lever or windup knob is transmitted to the spool from ratchet mechanism and spool shaft by way of friction connection. On the other hand, the rotation branched from the midway between ratchet mechanism and the spool shaft, is also transmitted to the sprocket by way of rewind mechanism. The rotation is further transmitted to the shutter from a point between the rewind mechanism and the aforementioned junction between the ratchet mechanism and the spool shaft. Along these pathways, the rotation of windup lever or windup knob is transmitted to the spool, the sprocket, and the shutter.

According to the second conventional type, rotation of windup lever or windup knob is transmitted to the spool from ratchet and spool shaft by way of friction connection. On the other hand the rotation is branched from between the ratchet mechanism and the spool shaft and is also transmitted to sprocket via rewind mechanism. These processes are the same as above. The rotation is further branched from the spool shaft and is transmitted to the shutter. In this way, rotation of the windup lever or windup knob is transmitted to each of the spool, sprocket, and shutter.

According to the third conventional type, rotation of the windup lever or windup knob is transmitted to the spool and sprocket through a similar path to the above. However, the rotation is branched between the ratchet mechanism and the spool shaft and then transmitted to the shutter. Rotation of the windup lever or windup knob is transmitted to each of the spool, sprocket, and shutter along such a path. As have so far been described, in conventional windup devices, rotation of the windup device is transmitted to the spool along the path different from the path to the sprocket and, when rewinding, only the sprocket can be rotated by the rewind mechanism.

It is necessary, however, to wind up the shutter along without advancing the film in order to make multiple exposures. For this purpose, in conventional windup devices, very complicated procedure must be followed to wind up only the shutter independently of the spool and sprocket. If only the sprocket is separated from the shutter system, the film is stretched by the rotation of the spool, and accurate multiple exposures are impossible due to the possible displacement of the film.

The other defects inherent in conventional windup mechanisms are as follows: In the mechanism which automatically restores the rewind condition by windup operation following the film rewinding, the spool applies tension strength to the film because it receives turning effect when the rewinding states returns to the windup state, at the rotational force is also transmitted to the sprocket by way of the film and, as a result, a pushing is produced between the rewind mechanism shaft and the sprocket which interferes the return movement of the rewind mechanism shaft. Moreover, since the sprocket is rotated, the relative positions of the gearings of rewind mechanism do not hold a predetermined relationship. As a result, the rewound position remains and incorrect multiple exposures are made to increase the film loss. In order to overcome these defects means are taken such as to strengthen the return spring of the rewind mechanism shaft, to increase the number of actuations of the clutch, and to provide friction between the sprocket and a fixed section of the camera body. However, these means are still far from satisfaction.

An object of this invention is to offer a film and focal plane shutter windup equipment, in which, multiple exposures can be made by simple operation; the multiple-exposure mechanism is automatically released and unwanted multiple exposures that might be made unconsciously can be prevented when only the shutter is wound up following multiple-exposure setting; multiple-exposure mechanism and rewind mechanism are organically combined to simplify the construction as well as to assure the action of the automatic return mechanism of the rewind mechanism.

This invention is concerned with a film windup equipment of cameras in which, a first clutch, which is coupled to the windup shaft by gearing to transmit the rotation of the windup shaft either to the sprocket or to the sprocket shaft when the film is wound up, and is cut off by manual operation when rewinding the film, is installed between the windup shaft and the sprocket or the sprocket shaft, and a second clutch, which engages with either the sprocket or the sprocket shaft and transmits the rotation of the sprocket or the sprocket shaft to the spool when winding up the film and is cut off either manually or depending on its rotating direction when rewinding the film, is installed between the sprocket or the sprocket shaft and the spool.

This invention is further concerned with a film windup equipment of the camera in which, the said equipment is interlocked with the shutter-charging equipment in such a manner that the aforementioned first clutch engages only at a predetermined fixed position or in fixed state, a hook member is provided which maintains the said clutch in cutoff state, and the said hook member is interlocked with said windup shaft to release the clutch from disengaged state and to enable the camera to make multiple exposures.

This invention will be described more in detail referring to illustrative embodiments shown in the drawing, in which:

FIG. 1 shows flow charts of operations of three types of conventional film windup means, A shows the first type, B shows the second type and C shows the third type which have been described in the foregoing.

Figure 1A:
FIG. 1 shows flow charts of operations of three types of the conventional film windup means.
Figure 1B:
Figure 1C:
Figure 2:
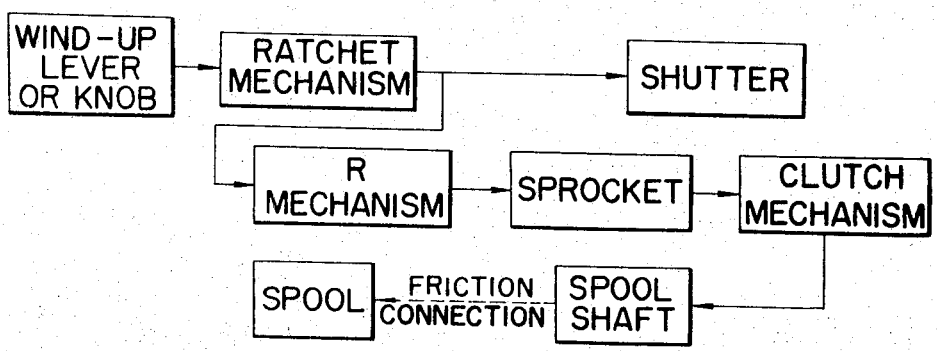
FIG. 2 shows a flow chart of operations of an illustrative embodiment of this invention.

FIG. 2 shows the block diagram of a transmission path of the invented windup equipment. Rotation of the windup lever or the windup knob is transmitted to the shutter by way of the ratchet mechanism. The transmission path is branched at a point between the ratchet mechanism and the shutter and the said rotation is transmitted to the sprocket by way of the rewind mechanism (including the first clutch) and further to the spool via the second clutch mechanism, the spool shaft, and the friction connection. An embodiment of this invention will be described in detail with respect to FIG. 3 in which 1 is the windup lever, 1a is a segment member rotatable with the windup lever 1 and engageable with a stopping member 29 fixed on the camera body for limiting the rotation angle of the windup lever, 2 is a ratchet wheel combined with the windup lever 1 which transmits the motion of the windup lever 1 to a disc 5 via a pawl 3, 4 is a spring which presses the pawl 3 onto the ratchet wheel 2, 6 is a windup shaft, one end of which is fixed to the disc 5 and the other to a gear driving 7; 8 and 9 are the idle gears, respectively. The gear 8 engages with the gear 7 and the gear 9 with an intermediate gear 10. Moreover, the gear 10 is connected to the shutter-charging means X by gears 11 and 12. On the other hand, a groove 10a is provided on a hub of the gear 10. The said rotation is transmitted to a sprocket shaft 14 by a pin 13 planted on the sprocket shaft 14 and slidably inserted into the groove 10a and at the same time the shaft 14 is slidable against the gear 10. The sprocket shaft 14 penetrates into a sprocket 16 and is enabled to rotate together with the sprocket by the help of a pin 15 planted on said shaft 14 and an elliptic groove 16a provided on the sprocket and elongated to the axial direction of the sprocket 16; 16' is an internal projection of the sprocket 17 is a sprocket, shaft-lowering spring installed between the sprocket shaft 14 and the sprocket 16; 19 is a clutch gear which fits on the upper portion of the sprocket shaft 14 and has a cylinder 19a extending downward; 18 is a clutch spring which is coiled clockwise and binds about the internal projection 16' and the cylinder 19a to form a freewheeling clutch mechanism. The clutch mechanism so formed transmits the rotation of the sprocket to the gear 19 when the sprocket is rotated counterclockwise since the coil diameter of the spring 18 is reduced by the friction force between the spring 18 and the projection 16' so as to tighten the projection 16' and the cylinder and further the mechanism works in the direction to which the aforementioned clutch spring 18 is loosened to free the gear 19 and the sprocket 16 when the sprocket is rotated clockwise since the coil diameter of the spring 18 is increased. The gear 19 transmits the rotation to a spool gear 22 by way of idle gears 20 and 21; 23 is a spool which is friction connected with the aforementioned spool gear 22 by a friction spring 24; 25 is a retaining member screwed to the gear 22 for causing the friction force between the gear 22 and the spool 23; 26 is a detent pawl engaging with the idle gear 21 for preventing the reverse rotation of the gears belonging to the spool system; 27 is a holding lever, one end 27a of which is engageable with a flange 14a formed on the sprocket shaft 14 and is so constructed as to be able to enter the step section of the sprocket shaft 14 formed below the flange 14a with the aid of a spring 28 when a button 14b provided at the lower end of the sprocket shaft 14 is pushed in the direction as shown by arrow R against the spring 17 so as to disengage the pin 13 from the groove 10a and the other end engages with the projections 7a provided in proper numbers all over the surface of the takeup gear 7 and functions to release the sprocket shaft 14 automatically.

Operation of the invented film windup equipment will now be described in detail.

Figure 3:
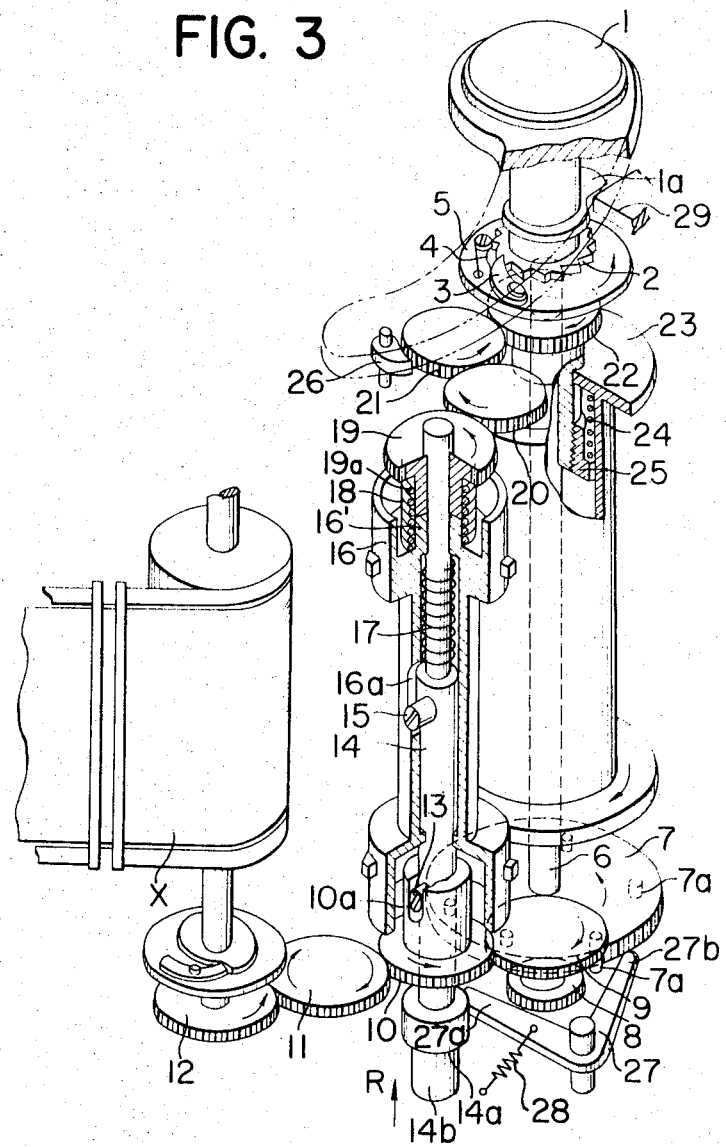
FIG. 3 shows a perspective view of an embodiment of this invention.

1. The case in which both the shutter and the film are wound up simultaneously (self-cocking cameras):

When in the situation shown in FIG. 3, the windup lever 1 is rotated for winding up until the segment member 1a abuts on the stopping member 29, the rotation is transmitted to the gear 7 by way of the one-way clutch mechanism, 2, 3, 4, 5 and the windup shaft 6, and the gear 7 is rotated in the direction of the arrow. This motion is transmitted via the idle gears 8 and 9 to the gears 10, 11, and 12 and the shutter is wound up. The sprocket 16 is also rotated similarly since the gear 10 is connected with the sprocket shaft 14 by the engagement of the pin 13 with the groove 10a and the sprocket shaft 14 and the sprocket 16 are also connected by the engagement of the pin 15 with the groove 16a. Furthermore, the rotation of the sprocket 16 is transmitted to the gears 19, 20, 21 and the spool gear 22 by the clutch spring 18 and, as a result, the spool 23 is rotated in the direction of the arrow to wind up the film (Each gear ratio is properly determined. In this embodiment each ratio of gears is so determined that one frame of film is advanced by one turn of the sprocket).

Figure 4:
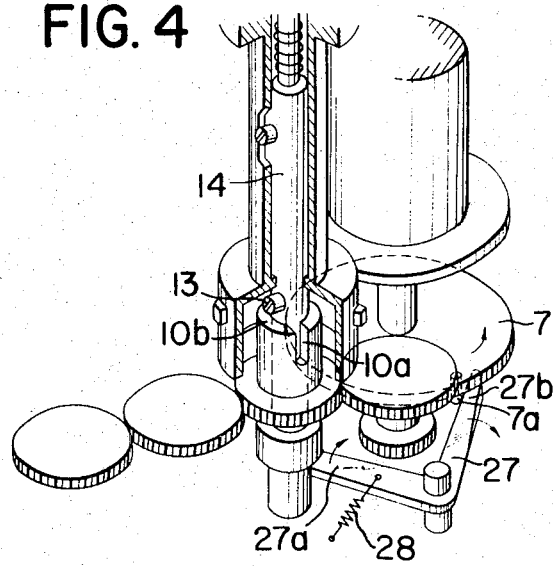
FIG. 4 is a perspective view of the rewind clutch halfway of shutter winding of the embodiment shown in FIG. 3 in the case of double exposure.

2. In the case of making multiple exposures:

When after the first exposure, double exposure is required to be made on the same frame, push up manually the button 14b in the direction of the arrow R. Then the pin 13 is disengaged from the groove 10a of the gear 10, the tip 27a of the holding lever 27 automatically falls on the stepped section of the sprocket shaft 14 formed below the flange 14a by the force of the spring 28 and prevents the sprocket shaft from going down. The other end 27b of the lever 27 intrudes into the rotation range of the projection 7a of the gear 7. When the windup lever 1 is rotated in this situation, the motion of said lever 1 is transmitted to the gears 10, 11, and 12 by way of the gear 7, the idle gears 8 and 9 and, as a result, the shutter is wound up. However, the sprocket 16 and the spool 23 do not receive rotating force and the film does not move at all since the sprocket 16 and the spool 23 are disconnected from each other due to the disengagement between the pin 13 of the sprocket shaft 14 and the groove 10a of the gear 10. On the midway of winding the shutter, the projection 7a of the gear 7 pushes the other end 27b of the lever 27, rotates the lever 27 clockwise to release hold that has preventing the sprocket shaft 14 from going down (refer to FIG. 4). However, since the gear 10 has turned more or less, the positions of the groove 10a and the pin 13 are shifted from each other. Therefore, the pin 13 hits on the end surface 10b of the gear 10 and the lowering of the sprocket shaft 14 is prevented by the upper surface of the hub of the gear 10 and the sprocket 16 is unaffected by the rotation. When the winding-up motion is continued and the shutter has been wound up, the gear 10 finishes its one turn, the pin 13 engages with the groove 10a, and the sprocket shaft 14 goes down and returns to the original position by the action of the spring 17. In this situation, since only the shutter has been wound up without advancing the film, double exposure is made only by releasing the shutter. Multiple exposures can be attained by repeating the aforementioned procedure. When the windup lever is rotated after multiple exposures without depressing the button 14b, a normal exposure can be made similar to the case 1.

3. Rewinding of the film:

The pin 13 of the sprocket shaft 14 and the groove 10a of the gear 10 are disengaged from each other similar to the aforementioned case 2 when the button 14b is pushed up manually. Simultaneously, one end 27a of the lever 27 prevents the lowering of the sprocket shaft 14 automatically. In this situation the sprocket 16 rotates reversely when the film is rewound. Since the direction in which this reverse rotation is made is the same as the direction in which the clutch spring 18 is loosened and the gears 19 through 22 do not turn reversely by the action of the detent pawl 26, sliding occurs in the clutch formation between the sprocket 16 and the gear 19. The spool is also rotated reversely in accordance with the movement of the film when the film is rewound, but since the spool slides by the action of the friction spring 24, only the spool rotates and rewinding can be completed.

4. Automatic restoration of rewinding:

As was described in 3, when the initial rocking motion of the windup lever 1 is made after the film has been rewound, one end 27b of the lever 27 is shaken by the projection 7a of the gear 7, and the other end 27a is also shaken to release the holding of the sprocket shaft 14. When the positions of the groove 10a of the gear 10 and the pin 13 coincide by further rotation, the sprocket shaft 14 is lowered by the force of the spring 17 and returns to the original position. In this case, no tension strength is applied to the film until the rewinding condition is changed to the winding-up A condition, that is, until the pin 13 falls into the groove 10a of the gear 10 since no revolving power is applied to the spool 16. Moreover, since the sprocket 16 does not rotate at all, the button 14b returns to the initial position A without fail within one turn of the gear 10.

Figure 5:
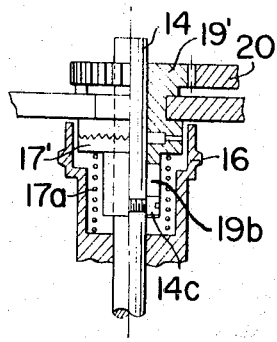
FIG. 5 through 7 are the cross sections of the second clutches of several examples which are located between sprocket and spool.
Figure 6:
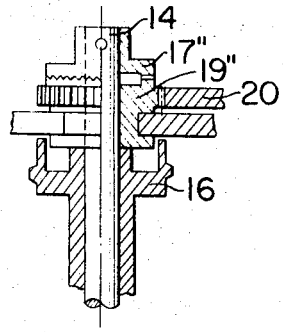
Figure 7:
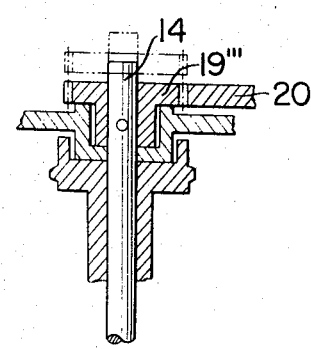

FIGS. 5 through 7 show other examples of the clutch installed between the sprocket and the spool. In FIG. 5, a driving clutch member 17' is slidably supported on the sprocket shaft 14 by means of the connection of a pin 14c and a groove 19b and is biased by a spring 17a toward a driving gear 19' which is connected to the idle gear 20. The driving member 17' and the driven gear 19' have mutually engageable sawtooth formations normally engaged with each other to switch from turning to nonturning or vice versa depending on the direction in which the sprocket is rotated. FIGS. 6 and 7 show the clutches which engage or disengage by the vertical movement of the sprocket shaft 14. In FIG. 6, a driving clutch member 17'' is fixed on the upper end of the sprocket shaft 14 and is axially moved therewith so as to disengage from a driven gear 19'' when the button 14 is pushed and in FIG. 7, a driving gear 19'' is fixed on the sprocket shaft 14 and is axially moved therewith so as to disengage from the idle gear 20 as shown by chain line when the button 14 is pushed.

When a clutch shown in FIG. 6 or FIG. 7 is employed, the nonreturn pawl is not required because the rotation of the sprocket in rewinding direction is not transmitted to the gears belonging to the spool system.

In the aforegoing embodiments, description was made assuming that one turn of the sprocket shaft equalled one frame of the film. In the case of half-frame size camera, it is of course admitted in order to let half-turn of the sprocket correspond to one frame to provide two grooves on setting the gear 10, or to assemble the rewind-setting mechanism in a shaft, which makes 1, ½, ⅓ ........ 1/n (where n is a positive integer) turn per frame, separately from the sprocket shaft. The clutch between the sprocket and the spool can be installed any place between them (in this embodiment, the clutch was installed between the sprocket 16 and the gear 22).

As has been described so far, according to this invention, the function of the rewind-setting mechanism (the gear 10, the groove 10a, pin 13, and the lever 27) can be utilized in multiple exposures as it is by only installing a clutch in between the sprocket and the spool. This means that the invented equipment can be conveniently assembled into the camera having a limited space. Moreover, when the camera is set at multiple-exposure state and the shutter is wound up, the camera returns to a self-cocking camera automatically by the action of the rewind automatic return mechanism. This prevents the misoperation of doing successive winding up in double-exposure state, and in the case of multiple exposures accurate superimpose is possible since the sprocket and the spool do not rotate at all and the film displacement does not occur. Furthermore, when releasing the rewind setting, the automatic returning from rewinding state to normal state can be carried out without fail since no turning force is applied to the spool.

What is claimed is:

1. A photographic roll film camera mechanism for a camera having an operating handle for simultaneous tensioning of a shutter and winding of a film strip, said mechanism comprising, in combination, a sprocket roller for feeding the filmstrip;
a film spool for winding the fed filmstrip;
means for tensioning the shutter;
a windup shaft coupled to the operating handle by a ratchet mechanism and guided through said film spool;
a first gear train for transmitting the rotation of said windup shaft to the shutter-tensioning means, including a driving gear carried by lower end of said windup shaft and having a plurality of protrusions on its one surface and an intermediate gear provided coaxially to said sprocket roller;
a sprocket shaft guided through and slidably fitting with said intermediate gear and said sprocket roller, said sprocket shaft being connected with said sprocket roller by means of a pin-and-slot connection and having a step section depressed at its lower end, said intermediate gear being provided between said sprocket roller and said step section;
clutch means for freeing said sprocket roller from said sprocket shaft, said clutch means being provided between said intermediate gear and said sprocket roller;
a spring inserted into said sprocket roller;
a button provided on the lower end of said sprocket shaft and depressible against said spring for actuating said sprocket-freeing clutch means;
a pivotable lever mounted on the camera body, one end of said pivotable lever normally engaging with the outer periphery of said step section and entering the inner periphery of said step section for holding said sprocket shaft in the depressed position thereof while said sprocket freeing clutch means is actuated, the other end of said lever being engageable with said protrusion of said driving gear for releasing said sprocket shaft from said one end of said pivotable lever when the operating handle is rotated, and
a second gear train provided between the upper end of said sprocket shaft and said film spool for rotating said film spool in accordance with that of said sprocket roller.

2. A photographic roll film camera mechanism according to claim 1, wherein said sprocket-freeing clutch means includes a hub projected from said intermediate gear toward said sprocket roller, a pin fixed on said sprocket shaft and a groove on said hub being engageable with said pin and opened at the upper end of said hub, thereby when said button is depressed, said pin is disengaged to said groove, and when said sprocket shaft is released from said pivotable lever, said pin is slidably contacted with the upper surface of said hub.

3. A photographic roll film camera mechanism according to claim 2, further comprising a freewheeling clutch spring provided between said sprocket roller and the first gear member of said second gear train supported by upper end of said sprocket shaft to free said sprocket roller from said second gear train when said button is depressed and the film is rewound.

4. A photographic roll film camera mechanism according to claim 2, further comprising an additional clutch mechanism provided between said sprocket roller and said second gear train and including a driving member slidable on said sprocket shaft and rotatable therewith by means of pin-and-slot connection, a pair of sawtooth formations on the side surfaces of said driving member and the first gear member of said second gear train, respectively, and a spring urging said driving member to said first gear member, thereby when said sprocket roller is rotated with said sprocket shaft in forward direction for film winding, said pair of sawtooth formations are meshed to each other and when said sprocket roller is reversed for film rewinding, said pair of sawtooth formations are disengaged.

5. A photographic roll film camera mechanism according to claim 2, further comprising an additional clutch mechanism provided between said sprocket shaft and said second gear train and including a driving member fixed on the upper end of said sprocket shaft, thereby when said button is depressed, said clutch mechanism is actuated so as to free said sprocket shaft from said second gear train.

* * * * *